United States Patent [19]

Searl et al.

[11] 4,451,586

[45] May 29, 1984

[54] PROCESS AND APPARATUS FOR MANUFACTURING FLAME RETARDANT FLEXIBLE FOAMED ARTICLES

[75] Inventors: Alonzo H. Searl, Fort Worth; Granville J. Hahn; Raleigh N. Rutledge, both of Big Spring, all of Tex.

[73] Assignee: Cosden Technology, Inc., Dallas, Tex.

[21] Appl. No.: 393,973

[22] Filed: Jun. 30, 1982

[51] Int. Cl.$^3$ .............................. C08J 9/00; C08J 9/02
[52] U.S. Cl. .................................... 521/88; 521/134; 521/907; 524/371; 260/DIG. 24
[58] Field of Search .................. 521/88, 134, 907; 524/371; 260/DIG. 24

[56] References Cited

U.S. PATENT DOCUMENTS

| 4,025,465 | 5/1977 | Dorrn et al. | 521/134 |
| 4,323,655 | 4/1982 | DiGiulio | 524/371 |
| 4,384,032 | 5/1983 | Tashiro et al. | 521/134 |

Primary Examiner—Lorenzo B. Hayes
Assistant Examiner—Nathan M. Nutter
Attorney, Agent, or Firm—Michael J. Caddell

[57] ABSTRACT

Process and apparatus are disclosed for manufacturing foamed articles such as tubes used as pipe insulation, which tubes are of a high impermeability and flexibility and are formed of a polymer, such as polyethylene or polypropylene, containing up to about 25% of an elastomer.

6 Claims, 6 Drawing Figures

PROCESS AND APPARATUS FOR MANUFACTURING FLAME RETARDANT FLEXIBLE FOAMED ARTICLES

BACKGROUND OF THE INVENTION

The present invention relates to a process and apparatus for manufacturing articles such as pipe insulation tubes from a foamed material and more particularly involves process and apparatus for manufacturing a highly flexible, impermeable article from a foamed polymer such as polyethylene or polypropylene, said article having a high degree of flame retardancy.

The prior art teaches methods of foaming polymers such as polystyrene as well as the foaming of elastomers such as synthetic rubbers. It is known that products manufactured from foamed polymers and elastomers exhibit good insulation properties under certain circumstances. For example, foamed polystyrene when foamed in large flat sheets has been used for insulation in home building between outer and inner wall structures. Likewise, foamed elastomers such as rubber have been used for insulation of air conditioning and water pipes in home and commerical construction. It is known that other polymers such as polyethylene can be foamed to provide advantageous insulating material. Unfortunately, all of the known polymers and elastomers suffer disadvantages when utilized as insulating material.

For example, when polymers such as polystyrene and polyethylene are foamed to form insulation, the resulting product is generally very stiff and/or brittle and therefore difficult to utilize on objects such as water pipes and air conditioning tubing which have considerable numbers of bends and curves. On the other hand, a foamed synthetic rubber such as neoprene provides a flexible insulating material, but one that is very expensive in cost due to the raw material cost. Also, many if not all of the elastomers utilized as foamed insulation suffer from being permeable to moisture which, as a result cuts down the insulating properties of the material and also allows migration of moisture into the insulated line thereby allowing corrosion and mildew to form.

In addition to these disadvantages, many pure elastomers which are foamed to form insulation do not provide a flexible final product because of cross-linking in the elastomer. In addition foamed rubbers are subject to degradation by the ozone content of the atomosphere and by ultra violet rays from natural sunlight and other sources. Furthermore the finished foamed product made of pure elastomers has a final bulk density of approximately six pounds per cubic foot. On the other hand, foamed polyethylene has a bulk density of just two pounds per cubic foot. Thus, even if the material costs were equal between elastomer and polymer, three times as much elastomer is required per unit volume than polymer thus making the relative cost of foamed elastomer at least three times that of the foamed polymers. Also, the manufacture of insulation utilizing foamed elastomer requires the use of an expensive heating system such as a radio-wave oven to heat the elastomer to form the necessary cross-linking.

The present invention overcomes these disadvantages of the prior art by providing a process for manufacturing foamed materials which exhibit high flame retardancy, good flexibility, and high impermeability. These materials are formed from a blend of a polymer such as polyethylene with an elastomer such as polyisobutylene.

BRIEF DISCRIPTION OF THE DRAWINGS

DESCRIPTION OF THE PREFERED EMBODIMENTS

Figure 1:
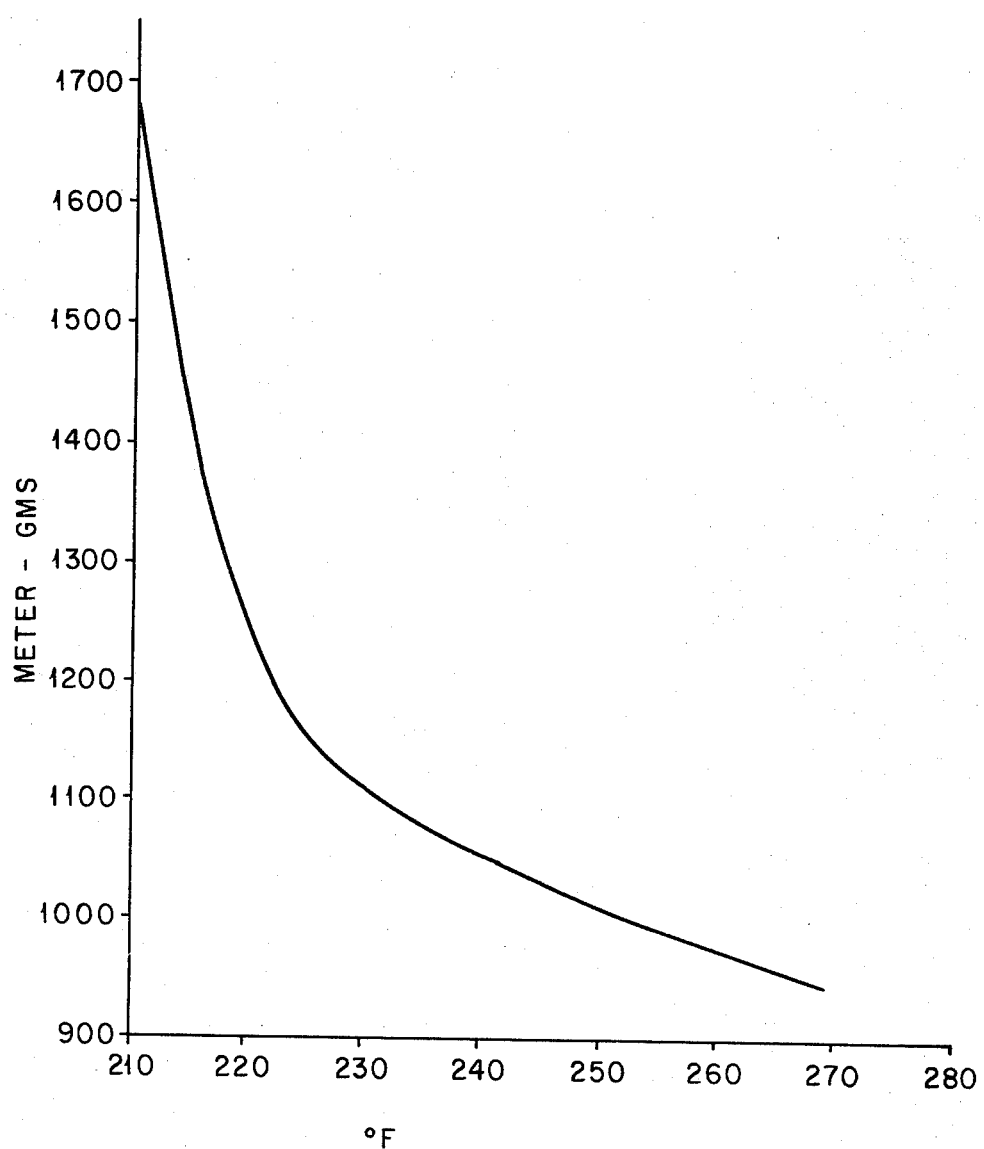
FIG. 1 is a graphic illustration of the relationship between viscosity and temperature for polyethylene.

In the manufacture of foamed thermoplastic material such as elastomers and foamable polymers the material is first brought to its liquid melt temperature and then subjected to injections of an easily vaporizable liquid element in order to create bubbles in the material which then solidify as the material is cooled below the melt temperature. It has been found that when a temperature is reached in the melted material at which the viscosity begins to increase very rapidly, the material is suitable for blowing into a foamed product. Generally a viscosity increase on the order of 100-200 meter-grams per degree F identifies a material which can be foamed, while materials which show lower rates of viscosity change with temperature will collapse after being foamed at the extrusion die head.

Viscosity measurements made on the Brabender viscosimeter (rollerhead) were utilized to establish parameters of the elastomeric materials. The rotational rates in the Brabender were established to provide a peripherial speed on the blades at or near the shear rate that the polymer encounters when traveling through the die orifice. The rotational rate found to be most nearly identical to the shear rate through the die was 20 rpm on the Brabender viscosimeter.

The selection of a foaming agent is also very important to the success of the foaming operation. The criteria for the foaming agent are very strict and include the requirements that the foaming agent be nontoxic and relatively nonflammable. Another key factor in selecting a foaming agent is that the gas-liquid phase change temperature be in the right range for foaming the polymer. Utilizing these criteria i.e., non-toxicity, nonflammability, and correct temperature range for gas liquid phase transition a gaseous fluorocarbon such as freon was selected for the foaming agent. The freon can be liquified and injected into the melted polymer to provide the correct foaming mechanism for forming the bubble cells therein.

It was also found that when the Brabender viscometer is running at 20 rpm the viscosity measured in the polymer, at a temperature approximating that required for producing a foam by fluorocarbon injection into the polymer, ranged from 1500 to 2500 meter-grams. For a polyethylene polymer the foaming temperature lies between about 200° F. and about 230° F. For polypropylene polymers the foaming temperature range lies between about 280° F. and 330° F. By analogy to other viscometers the range of 1500 to 2500 meter-grams is roughly equivalent to about 15,000 to 30,000 poise.

As previously mentioned, when a temperature is reached in the melted polymer such that the viscosity increases very rapidly the polymer is suitable for blowing by this process. A viscosity increase in the order of 100 to 200 meter-grams per degree F indicates a polymer which can be foamed by the present invention. Materials which show lower rates of viscosity change with temperature in the 1500-2500 meter-gram viscosity range will collapse after being foamed at the extrusion head. Below 1500 meter-grams viscosity the melted polymer will not develop sufficient stiffness to retain the gaseous fluorocarbon and consequently the cells will collapse. Alternatively if the viscosity of the material is too high, i.e. greater than 2500 meter-grams, the stiffness of the polymer will prevent a full blow of the material and the result is a product specific gravity which is undesirably high. Unfortunately, for most polymers the temperature range in which the viscosity of the melt lies between 1500 to 2500 meter-grams is extremely small. This temperature range or "window" is a critical factor in the foamability of polymers. If the window is extremely small such as one or two degrees F., the processing equipment is unable to maintain the polymer at a constant temperature in this small a window and the resulting foam will be nonhomogeneous and generally unacceptable to the end user.

It was found that the addition of a different material to the polymer could affect the temperature range at which the proper viscosities fall. For example, the addition of a elastomer will broaden the window and allow the material to be foamed into an acceptable foamed product.

It was also found that not just any elastomer could be added to any polymer. There is a further criteria for the addition of elastomers to polymers to provide a successful foamed product. This criteria involves the solubility parameters of the various components in the blended material. It was found that polymer-elastomer blends in which the solubility parameters of the two components are widely divergent would result in phase separation of the mixture. Although the two materials may be compatible in blends with a low proportion of one material or the other, they became incompatible when the proportions were increased to any significant level. For example, a mixture of polyethylene and polyvinylchloride in small proportions i.e., in the range of 1 to 2% could be successfully blended. At any higher concentrations, i.e. 10%, the blend lost its integrity and physical strength and the product separated. The solubility parameter for polyethylene and that for polyvinylchloride are 7.98 and 9.55 respectively. The following Table I lists the solubility parameters for several well known polymers and elastomers.

TABLE I

| SOLUBILITY PARAMETERS OF SELECTED MATERIALS | |
|---|---|
| POLYMER | SOLUBILITY PARAMETER |
| Polytetrafluoroethylene | 6.2 |
| Polypropylene | 7.38 |
| EP Rubber (50% Ethylene) | 7.68 |
| EP Rubber (60% Ethylene) | 7.74 |
| Polyethylene | 7.98 |
| Polyisobutylene | 8.18 |
| Polystyrene | 9.12 |

TABLE I-continued

| SOLUBILITY PARAMETERS OF SELECTED MATERIALS | |
|---|---|
| POLYMER | SOLUBILITY PARAMETER |
| Polymethylmethacrylate | 9.12 |
| Polyvinylchloride | 9.55 |

By looking in the above table one can find that the solubility parameter for polyethylene is 7.98 and that for polyvinylchloride is 9.55. This indicates a significant spread in the solubility parameters of these two products which means that they are basically incompatible in amounts greater than about 5%.

On the other hand, considering the solubility parameters of polyethylene at 7.98 and polyisobutylene at 8.18, one can see that the solubility parameters are very close together and that these two materials would make a successful blend. Since polyethylene provides a polymer having strong foaming characteristics and polyisobutylene is an elastomer providing great flexibility, the combination of the two into a foamable blend results in a foamed product having great flexibility as well as impermeability.

Thus the parameters relating to the success or failure of a foamed material include the viscosity range and the rate of change of viscosity with temperature, which parameters describe the mechanical requirements of the material. In addition to these mechanical or physical requirements, the material must also exhibit a bubble wall of sufficient thickness to provide strength and of a particular chemical structure to prevent diffusion of the freon gas therethrough. Also, the materials selected must exhibit solubility parameters within the same general range of each other for successful blending and prevention of phase separation. As previously mentioned, the material to be foamed must lie within a particular range of viscosities in order to successfully form bubbles or cells in reaction to the foaming agent. Above a viscosity of about 2500 gram-meters the material is too stiff to form successfully into large enough bubbles and below a viscosity of about 1500 gram-meters the material is too flimsy and will not support the bubble structure but will collapse.

Referring now to FIG. 1, this figure illustrates a graph of the relationship between viscosity and temperature for a pure polyethylene material. The viscosity range of 1500 to 2500 gram-meters falls below a temperature of about 213° F. Thus given the required viscosity range of 1500 to 2500 gram-meters the window for pure polyethylene appears to be from a desirable temperature of about 200° F. up to a maximum of about 213° F. for a total window of about 13° F.

Figure 2:
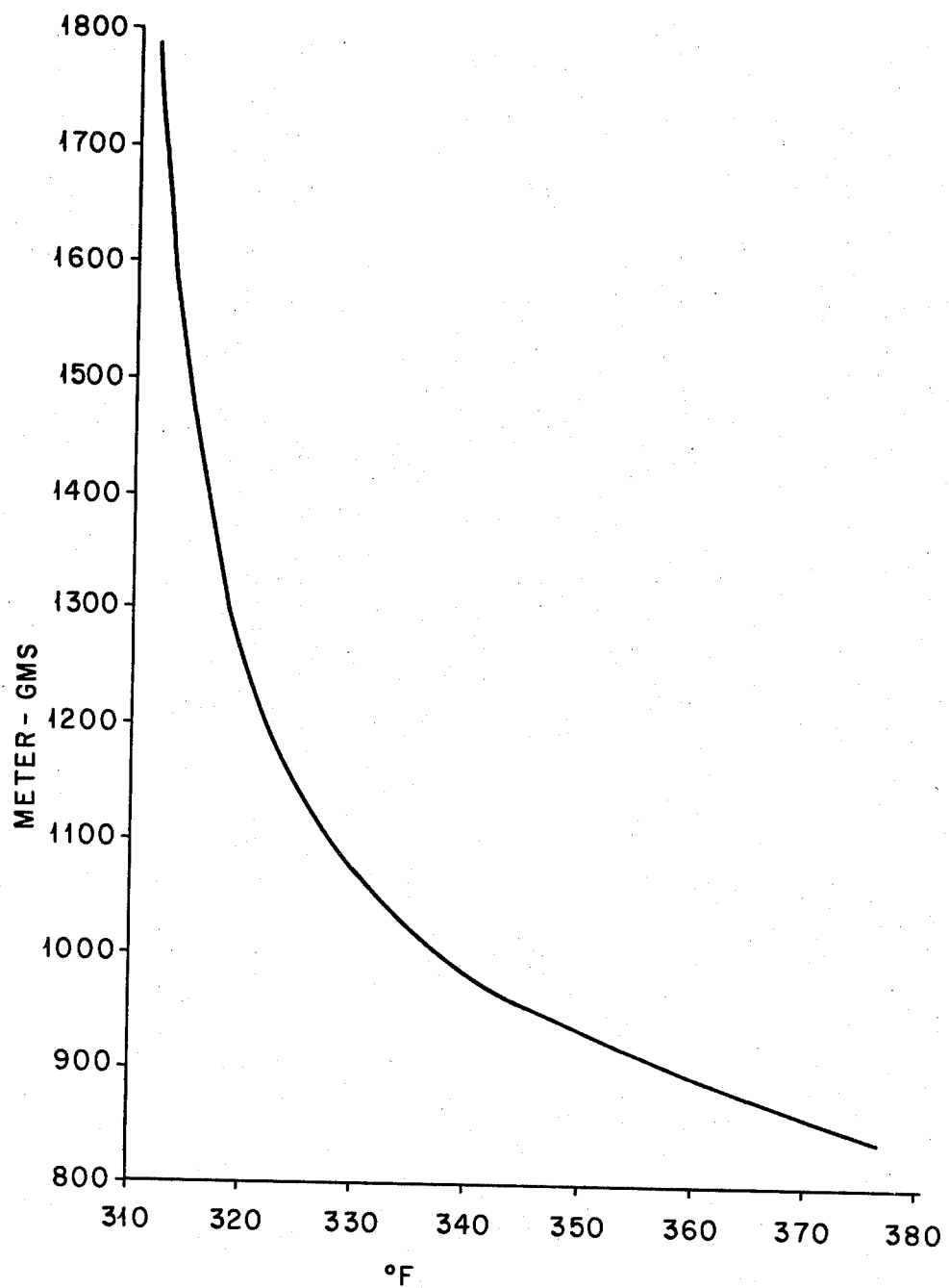
FIG. 2 is a graphic illustration of the relationship between viscosity and temperature for a blend of polypropylene and a copolymer comprising ethylenepropylene.

FIG. 2 is a graphic illustration of the viscosity temperature characteristics of a blend of a copolymer such as polypropylene and a elastomer. The elastomer is an ethylene-propylene copolymer. By comparing the curve of the graph of FIG. 1 with the curve of the graph of FIG. 2, it can be seen that polypropylene which normally has a very steep transition curve, can be brought into the range of polyethylene by the addition of the elastomer ethylene-propylene. It is evident that the curvature and slope of the curves in FIGS. 1 and 2 are almost identical except for the shifting of about 80° in temperature. Thus the addition of the ethylene-propylene elastomer having a close solubility parameter as shown in Table I to that of the polypropylene results in flattening out the viscosity curve of polypropylene to the point where it is very similar to the viscosity curve of polyethylene. In the blend of polymers of FIG. 2, approximately 30% by weight of polypropylene was blended with 70% ethylenepropylene.

Figure 3:
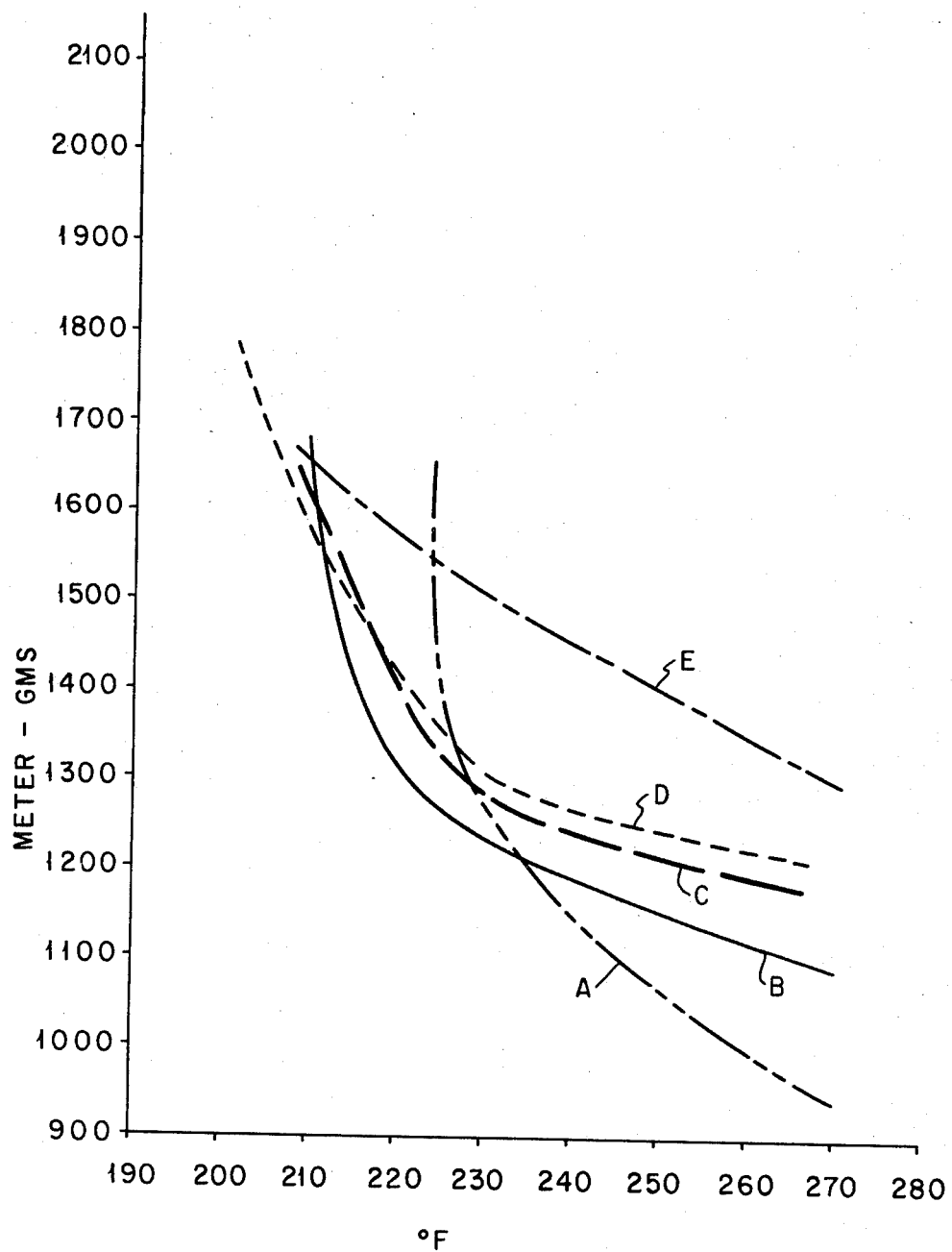
FIG. 3 is a graphic illustration of the viscosity-temperature curves of several different blends of polyethylene and polyisobutylene.

This broadening of the foaming window, which is directly pictorially represented as a flattening of the viscosity curve, can more clearly be seen in FIG. 3. In this Figure various mixtures of polyethylene with an elastomer polyisobutylene have been tested for viscosity across the pertinent temperature ranges. Curve A represents strictly 100% polyethylene containing no elastomer. It can be seen from curve A that in the range of 1500 gram-meters to 2500 gram-meters the viscosity curve is extremely steep and covers a very small temperature window. Curve B represents a blend of approximately 93% polyethylene and approximately 7% polyisobutylene. Curve C has shifted the transition phase into a lower temperature range and has flattened the curve of the viscosity over that of curve A considerably. The temperature window of Curve B has been extended several times over that of Curve A. Thus it can be seen that the addition of as small an amount as 7% elastomer has a significant effect upon the viscosity-temperature curve of the resulting blend.

Curve C represents a blend of approximately 87.5% polyethylene and 12.5% of the elastomer polyisobutylene. Curve C has an even flatter rate of viscosity increase in the requisite temperature range then did curve B and represents an even larger temperature window for successful foaming of the blend. Curve D represents a blend of 75% polyethylene and 25% polyisobutylene. Curve D represents an additional improvement in the slope of the viscosity-temperature curve over that of the blend of Curve C. Curve E represents a 50% polyethylene and 50% polyisobutylene mixture having an almost flat viscosity-temperature curve which represents an extended temperature window.

Thus it can be seen from the graphic illustrations of the viscosity temperature relationships of FIG. 3 that the continued addition of elastomer to the polymer results in expanding the desirable temperature window for foaming the elastomer. It was found that amounts of elastomer in polyethylene, up to about 25%, resulted in the most desirable finished foamed product. When elastomer amounts higher than about 30% are blended with the polymer, it was found that the resulting product could not retain its foamed characteristic and would tend to collapse back towards its original unfoamed state. Thus the curve represented at D appears to indicate about the optimum blend mixture for foamed polyethylene.

In the above-noted blends of polyethylene and polyisobutylene, the polyethylene used was commercially available as "Rexene 102" sold by the Rexene Division of El Paso Products Company of Paramus, N.J. 07652. The polyisobutylene is commercially available as "Vistanex L-100" sold by the Exxon Chemical Americas company located at Houston, Tex. 77001.

Figure 4:
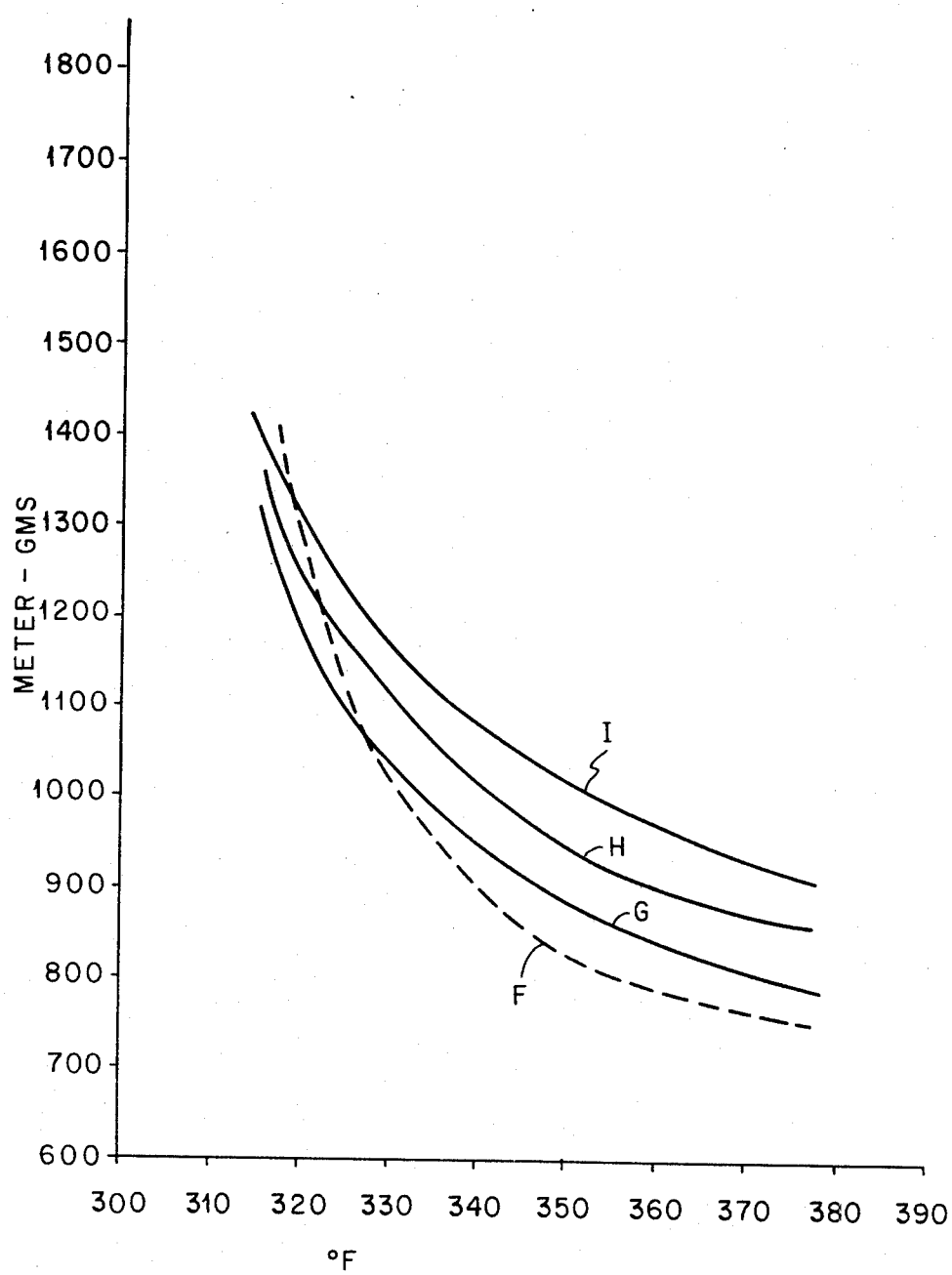
FIG. 4 is a graphic representation of the viscosity-temperature relationships of several different blends of polypropylene and an elastomer.

Referring now to FIG. 4, viscosity temperature curves are illustrated for the blending of polypropylene and an elastomer. In this blend the polypropylene utilized was commercially available under the trade name PP18S2A sold by the Rexene Division of El Paso Products Company. The elastomer utilized for blending with the polypropylene was a copolymer comprising ethylene and propylene. This copolymer is commercially available under the trade name Vistalon sold by the Exxon Chemical Americas company. The curves of FIG. 4 illustrate the effect of adding an elastomer to a pure polypropylene material. For example, curve F represents the viscosity-temperature relationship for a pure polypropylene material. The steepness of the viscosity curve in the range of 1500-2500 meter-grams indicates that polypropylene has an extremely narrow window for successful foaming. Curve G represents a blend of polypropylene with the elastomer, ethylene-propylene, indicating a flattening out of the viscosity curve and a broadening of the foaming window. Curve G represents a blend of 90% polypropylene and 10% elastomer. Curve H represents an increase in the elastomer content of the polypropylene to 25%. A further broadening of the window and flattening of the viscosity curve can be seen in H as well as in curve I which represents a 50% elastomer content. As previously mentioned with respect to polyethylene, the optimum amount of elastomer for blending with polypropylene appears to be about 30%.

A blend of polyethylene and polyisobutylene, containing about 25% polyisobutylene and the remainder polyethylene, was manufactured according to the present invention. The resulting product was a low density polyethylene foam pipe insulation having expanded closed-cell structure produced by a continuous extrusion process. The insulation is formed into flexible tubing having a wall thickness of approximately ⅜ inch and formable in IDs of from ½ inch to about 2⅛ inch. The heat range of this product was measured to be from −110° F. to 210° F. The thermal conductivity was found to be 0.24 btu's/hr-ft$^2$°F./in at 75° F. The product was stabilized against UV degradation and had a high chemical resistance to a wide range of chemicals. The product weighed approximately 2.5 lbs per cubic foot and was highly flexible. The permeability of the product was 0.03 perms per inch as compared to a standard commerical foamed elastomer having a permeability of 0.20 perms per inch. Thus the product of this invention exhibited a permeability of approximately one-seventh that of a foamed pure elastomer.

The present invention produces products particularly advantageous for use in the thermal insulation of heating and refrigeration piping. The product was compared with seven commerically available foamed products and found to be superior in almost every instance. For example, the density of the commercial products ranged from 4.0 up to 8.5 lbs per cubic foot and averaged around 6 to 6.5 lbs per cubic foot. The density of the product made by this invention generally ranged from 2 to 2.5 lbs per cubic foot. Likewise the vapor transmission of the commercial products ranged from 0.05 up to 0.20 perms per inch whereas the present invention exhibited a permeability of only 0.03 perms per inch. The chemical resistance of the present product was superior to that of all comparable products.

Figure 5:
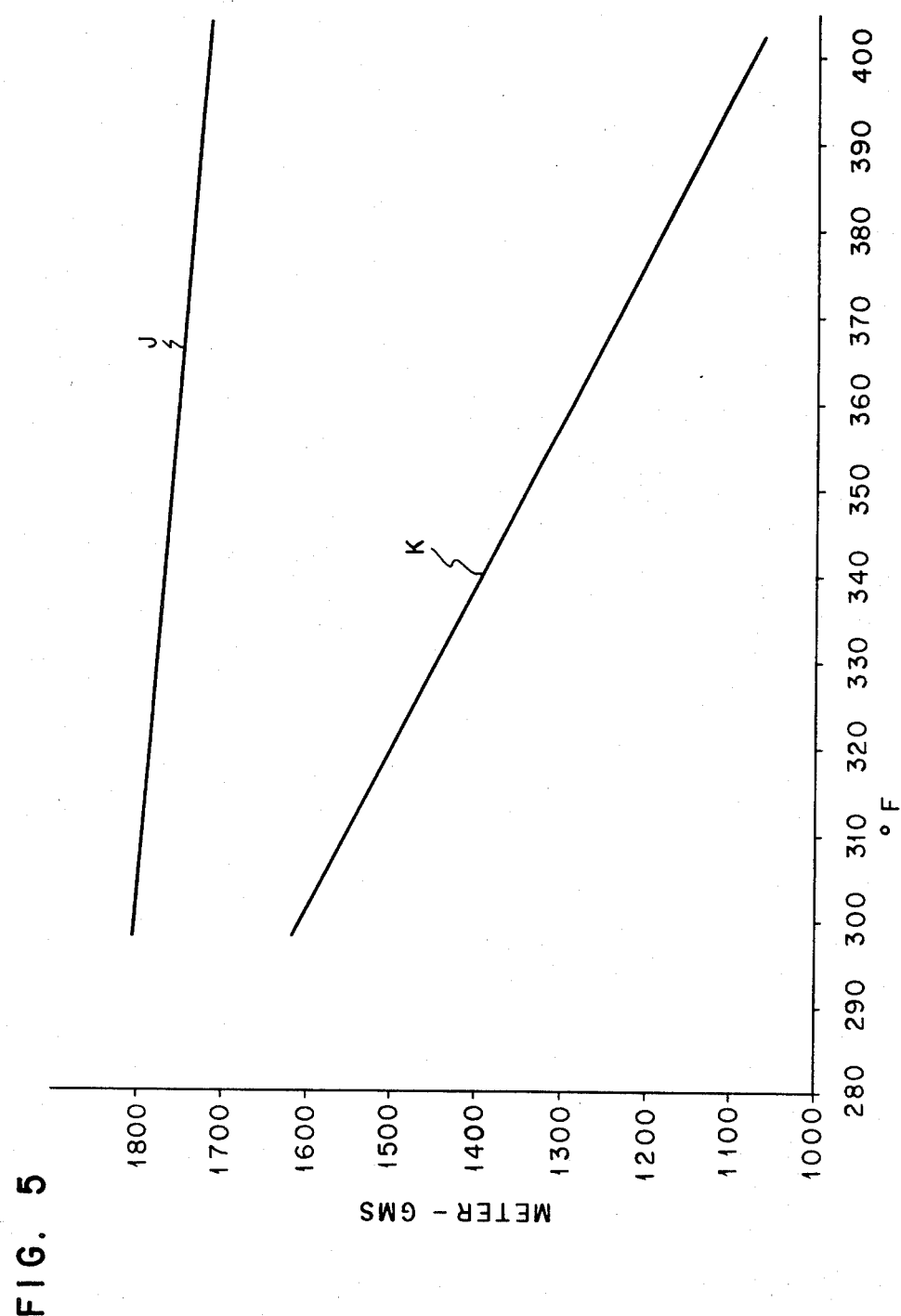
FIG. 5 is a graphic representation of the viscosity-temperature curves of two different elastomers; and, FIG. 6 is a schematic diagram illustrating the apparatus utilized to perform the process of the present invention.

FIG. 5 is a graphic representation of the viscosity-temperature curves for the two specific elastomers mentioned with respect to FIGS. 3 and 4. The viscosity curve J represents the relationship of viscosity and temperature for a pure polyisobutylene material. The flatness of the curve J indicates that this material in its pure state is unacceptable as foamed material because of its lack of a rapid rise in viscosity as previously mentioned. To be successful a material must have a viscosity increase on the order of 100-200 meter-grams per degree F. in the temperature range associated with a viscosity of 1500 to 2500 meter-grams. Any materials which show lower rates of viscosity change with temperature in this viscosity range will collapse after being foamed. Thus the polyisobutylene, having a relatively low viscosity change per degree F., would not sustain a closed cell structure. Likewise, curve K represents the elastomer ethylene-propylene also having a very flat, straight viscosity curve indicating that this elastomer in its pure state would also be unacceptable as a foamed insulation product.

It was also found that by manufacturing foamed tubing according to the present invention that an addition of a fire retardant material in the polymer elastomer blend resulted in a foamed product having highly desirable flame retardant capabilities. For example, a polyethylenepolyisobutylene blend modified with a conventional fire retardant additive was found to be self-extinguishing when flame was applied directly to the foamed product then removed.

In one particular embodiment a flame resistant insulation product was formed having high flame retardancy characteristics. The formulation for this product is as follows:
  Polyethylene . . . 100 g.
  Polyisobutylene (L-100) . . . 27 g.
  Surlyn . . . 2 g.
  Decabromodiphenyloxide . . . 11.5 g.
  Antimony Oxide . . . 7.5 g
  Carbon Black . . . 8 g.

The Antimony Oxide and Carbon Black were added as nucleating and coloring agents. A fluorocarbon such as freon was used to foam this blend. The blend was melted in an extruder and foamed prior to extrusion through a tubular extrusion die.

The above blend, after extruding the foam melt through a tubular extrusion die, produced an evenly distributed, large-cell foam exhibiting good impermeability and high flexibility as well as low bulk density and extremely good fire retardancy. The bulk density of the finished product was around two pounds per cubic foot and the permeability was approximately 0.03 perms per inch. The flame retardancy as determined by ASTM E-84 procedure was less than 25 for flame spread and less than 50 on smoke density. No toxic fumes were produced when burned. Thus the product formed fits all the criteria for a very successful insulation product.

Figure 6:
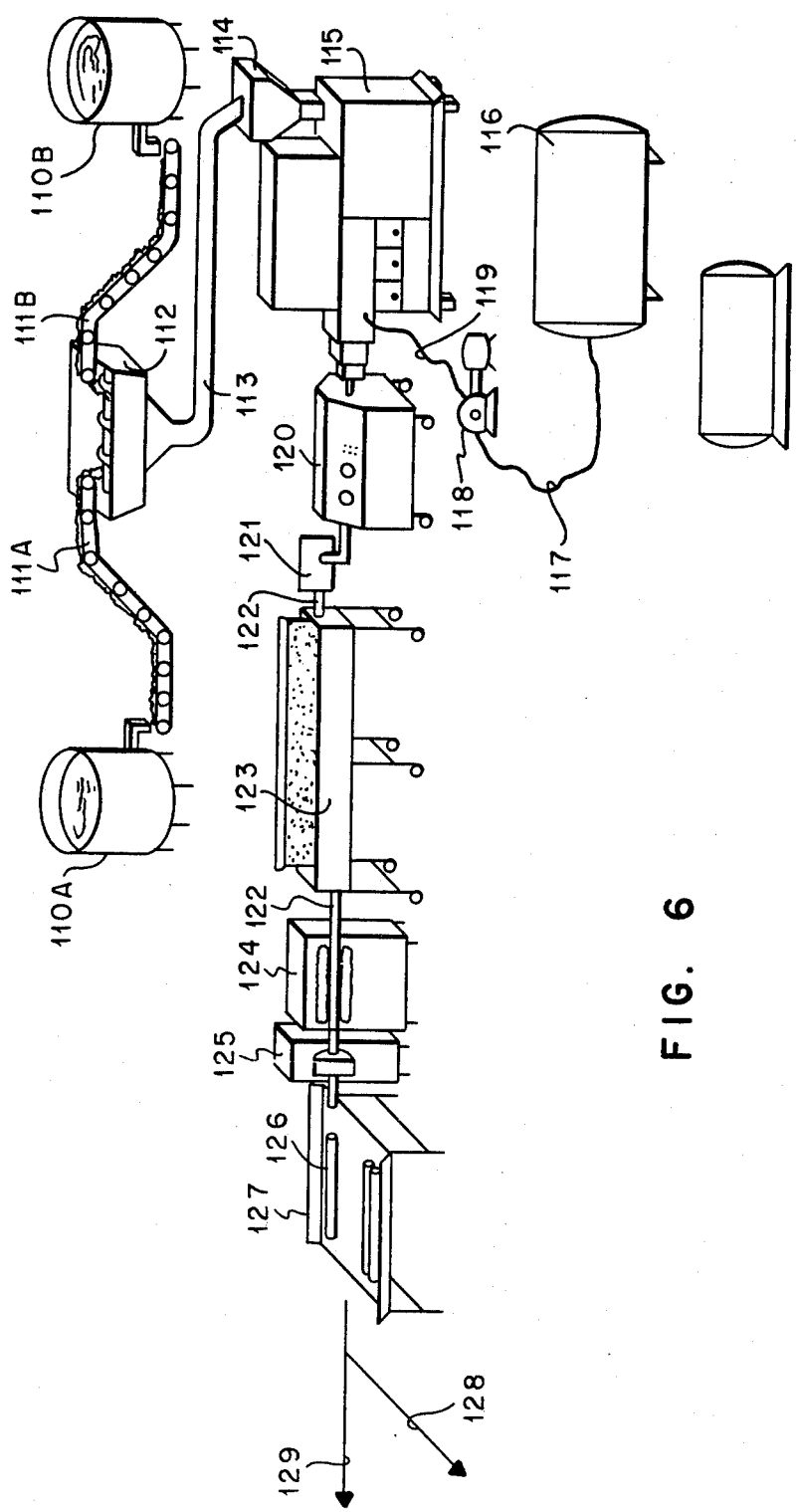

Referring now to FIG. 6, a schematic diagram is illustrated of the equipment utilized to manufacture foamed tubing according to the present invention. In FIG. 6, a raw material such as polyethylene is dumped into a granulator 110 which forms the material from either a solid, a powder, or a flaky substance into a granular or palletized form. One or more of these granulators 110 can be used depending on the number of components to be blended. For example, a granulator 110A can be dedicated to the granulation of polyethylene and a second granulator 110B can be used for granulating the elastomer polyisobutylene. The granulators supply a granulated material to a conveyor system 111 which feeds into blender 112 for providing a relatively homogeneous blend of the polymer, the elastomer, and a flame retardant (if used). The blend then passes down through conveyor tube 113 and into feed chute 114 of an extruder 115.

Extruder 115 applies mechanical work to the homogeneous blend of pellets to raise the blended material above its melt temperature. A storage tank 116 containing a blowing agent, such as liquid freon, supplies the agent via line 117 and pump 118 into the rotary extruder. The foaming agent passes from pump 118 through feed line 119 directly into the extruder, whereupon it is dispersed into the material to gasify and form closed-cell structure in the molten plastic. The foamed plastic then passes into a heat exchanger 120 which normalizes the temperature at a predetermined desired level for extruding the foamed material. The heat exchanger 120 standardizes the temperature level of the liquid polymer to maintain a constant temperature throughout.

The normalized liquid melt then passes under pressure to an extruding die 121, which extrudes the foamed material into a tubular cyclindrical shape 122. This shape is cooled in a water tank 123 and extends into a puller 124 which maintains a tension on the product 122 to maintain a constant and even flow of the extruded material from die 121. From the puller 124 the material passes into a timed cutter assembly 125 which cuts the cooled tubing into preselected desirable lengths 126 which are then removed from table 127 and either sent to shipping 128 or warehouse 129.

It should be noted that heat exchanger 120 is of the counterflow oil bath type heat exchanger capable of maintaining the temperature of the melt within plus or minus one degree F. This is important for maintaining exactly desired qualities of the final extrudate. The use of the heat exchanger also allows the process to be performed with polypropylene which has a relatively narrow temperature window for extrusion.

Thus the present invention discloses a process for forming a flexible, impermeable, low-density foamed insulation tube for placement around air conditioning and other types of pipes needing insulation. The process involves the blending of an elastomer in amounts up to about 30% with a polymer such as polyethylene or polypropylene wherein the elastomer and the polymer have solubility parameters which are very close to each other. By blending the polymer and elastomer and working the blend in an extruder at the viscosity range of 1500 to 2500 meter-grams and in a narrow temperature window, the addition of a foaming agent to the melt provides an ideal homogeneous large-bubble foamed material which is excellent for pipe insulation and other types of insulation. The present process teaches the manufacture of a highly impermeable very flexible insulation material with a very low bulk density and consequently a very low unit cost. The invention also discloses a configuration for the tubular form of the insulation material which is particularly adapted for placement around tubular piping. n The invention also discloses a particularly fire resistant insulating product manufactured according to the present invention.

Although a specific preferred embodiment of the present invention has been described in the detailed description above, the description is not intended to limit the invention to the particular forms or embodiments disclosed therein since they are to be recognized as illustrative rather than restrictive and it will be obvious to those skilled in the art that the invention is not so limited. For example, whereas polyethylene and polypropylene are disclosed as polymers for foaming, it is clear that other polymers can be used such as polystyrene and polyvinylchloride providing the manufacturer selects an elastomer having a solubility parameter very near that of the polymer. Also, other fire retardants such as pentabromodiphenyloxide could be used in lieu of that disclosed in the example. Thus the invention is declared to cover all changes and modifications of a specific example of the invention herein disclosed for purposes of illustration, which do not constitute departure from the spirit and scope of the invention.

The embodiments of the invention in which an exclusive property or privilege is claimed are defined as follows:

1. A foamed fire-retardant polymer article having improved impermeability and flexibility, said article comprising:
   a polymer exhibiting high impermeability;
   an elastomer blended with said polymer and having a solubility parameter close to that of said polymer;
   a fire-retardant blended with said polymer and elastomer; and,
   said polymer/elastomer/fire-retardant blend having a closed-cell structure.

2. The polymer article of claim 1 wherein said polymer is polyethylene and said elastomer is polyisobutylene.

3. The polymer article of claim 1 wherein said polymer is polypropylene and said elastomer is the copolymer, ethylene-propylene.

4. The polymer article of claim 2 or claim 3 wherein said fire-retardant is decabromodiphenyloxide.

5. The polymer article of claim 2 or claim 3 wherein said fire-retardant is pentabromodiphenyloxide.

6. The polymer article of claim 2 or claim 3 wherein said polymer is present in an amount of from about 70 to about 95 percent by weight, said elastomer is present in an amount of about 30 to about 5 percent by weight, and said fire-retardant is slected from the group consisting of decabromodiphenyloxide and pentabromodiphenyloxide.

* * * * *